United States Patent [19]

Schanefelt et al.

[11] 3,951,947

[45] Apr. 20, 1976

[54] THIN-THICK WAXY MALZE BASED STARCH DERIVATIVE FOR ACID AND NEUTRAL RETORT MEDIA

[75] Inventors: Robert V. Schanefelt; James E. Eastman; Michael F. Campbell, all of Decatur, Ill.

[73] Assignee: A. E. Staley Manufacturing Company, Decatur, Ill.

[22] Filed: Sept. 17, 1974

[21] Appl. No.: 506,820

Related U.S. Application Data

[63] Continuation-in-part of Ser. No. 387,579, Aug. 10, 1973, abandoned.

[52] U.S. Cl. .................... 260/233.3 R; 260/233.5
[51] Int. Cl.$^2$ ......................................... C08B 31/00
[58] Field of Search ...................... 260/233.3, 233.5

[56] References Cited
UNITED STATES PATENTS

| | | | |
|---|---|---|---|
| 3,238,193 | 3/1966 | Tuschhorr et al. | 260/233.5 |
| 3,369,910 | 2/1968 | Ganz | 260/233.3 R |
| 3,422,088 | 1/1969 | Tuschhoff et al. | 260/233.3 R |
| 3,719,661 | 3/1973 | Robinson et al. | 260/233.3 R |
| 3,751,410 | 8/1973 | Caracci et al. | 260/233.3 R |
| 3,804,828 | 4/1974 | Szymanski et al. | 260/233.3 R |

*Primary Examiner*—Lewis T. Jacobs

[57] ABSTRACT

A thin-thick, hydroxypropylated, crosslinked root-type starch derivative for continuous process pressure cooking, which remains stable over a wide pH range (3–7), and maybe used in both neutral and acid food systems. Suitable base starches include waxy maize, waxy milo, waxy sorghum, and any amylopectin-rich starch which is low in amylose contents.

These hydroxypropylated starch derivatives are non-jelling, heat stable, freeze-thaw, and are crossed linked to a level at which their aqueous suspensions are initially low in viscosity and then developed full viscosity upon heating in sealed containers, thereby permitting initial rapid heat penetration necessary for the heat sterilizations of canned foods processed in high temperature-short time sterilization (HTST) food canning processes, in which the complete retorting cycle is less than 20 minutes.

Use of these starch derivatives greatly facilitates the preparation of heat processed foods, contributing to excellent color, smooth texture, good clarity, flavor and food value. Even delicate, heat sensitive flavors are preserved.

15 Claims, No Drawings

THIN-THICK WAXY MAIZE BASED STARCH DERIVATIVE FOR ACID AND NEUTRAL RETORT MEDIA

This application is a continuation-in-part of copending application Ser. No. 387,579 filed Aug. 10, 1973, now abandoned.

BACKGROUND OF THE INVENTION

As the time and distance period between food harvesting and ultimate consumption increases, it becomes increasingly necessary to rely on preservation processes such as quick freezing and canning to maintain the food in wholesome condition. Food preservation is also important to handle bumper crops of perishable food items, such as fruits and fresh vegetables.

Most canning processes require a sterilization technique which will effectively sterilize the canned food after canning. For the sterilization technique to be effective, sufficient heat must be put into the food mass in the can for sufficient time to completely sterilize the contents without adversely affecting the food flavor or texture. It can be well appreciated that accomplishing the complete canning process in the shortest possible time commensurate with sterilization requirements increases production rates and thereby can contribute to reduced production costs.

DESCRIPTION OF THE PRIOR ART

A modified starch derivative which exhibited some degree of thin-thick characteristics is described in U.S. Pat. No. 3,422,088, assigned to a common assignee herewith. The composition described in that patent includes phosphorus oxychloride to accomplish crosslinking of a yellow dent cornstarch, which contains about 27% amylose by weight. It has been found that the starch derivative described in the above patent is not stable at the elevated temperatures required for superatmospheric, HTST retort canning, because the crosslinking breaks down, and the starch becomes thick too soon at the periphery of the food mass, thereby reducing further heat penetration.

Another method of modifying starch to obtain thin-thick behavior is described in U.S. Pat. No. 3,463,668. That patent is directed to a reaction of a glycine and a chlorine-containing oxidizing agent with a granular starch to obtain an inhibited product possessing labile crosslinkages. There is no disclosure in this patent of heat penetration, rates, or heat stability, and the patent indicates that maximum retort thickening of this product took about an hour and a half, much more time than for the new starch product of the subject invention, and certainly in excess of the time allowable for high volume, HTST continuous retort canning processes. Some means of continued agitation during the prolonged thickening time would be required if this type of starch were used to keep the food particles in the can from settling to the bottom.

U.S. Pat. 3,751,410 issued Aug. 7, 1973, describes a starch crosslinked with sodium trimetaphosphate, which is thereafter modified by incorporation of a hydroxypropyl functional group. The product is said to be useful as a food thickener for foods such as fruit pie fillings, lemon puddings, sauces, gravies, baby foods and chocolate puddings. Starches included as useful are waxy milo, potato, tapioca, corn, waxy corn, red milo, and high amylose starches. Potato, waxy and tapioca starch are preferred. The description is quite specific regarding the crosslinking requirement, 0.01–0.3g. of sodium trimetaphosphate being required. M.S. (molar substitution) of hydroxypropyl groups required is from 0.03 to 0.09. No mention is made here of the retort canning of food, or of the requirement of delayed thickening required for canning media used in the retort processes requiring sterilization of the sealed containers.

SUMMARY OF THE INVENTION

This invention provides a hydroxypropylated, crosslinked, high amylopectin, low amylose starch derivative having thin-thick viscosity characteristics under acid pH and neutral conditions ranging from about 3–7. The high amylopectin starch may be selected from the group consisting of waxy maize, waxy milo, waxy sorghum and other high amylopectin starches having a minimum amylose content. At the present time, waxy maize starch is preferred as the base starch. This starch derivative also exhibits excellent heat penetration when slurried for use in a superatmospheric retort media, which makes it especially suited for high temperature, short time sterilization (HTST) continuous retort (pressure cooking) canning processes in which the initial low viscosity, high heat penetration characteristic allows rapid heat sterilization of the sealed mixture of retort media and canned food, and in which the retort media thereafter thickens substantially to maintain the canned food in suspension.

The product typically has a hydroxypropyl d.s. of about 0.1 to 0.23, which is carefully balanced with a degree of crosslinking (evidenced by alkali fluidity tests) to give a Brookfield viscosity when heated to 180°–185° F., of about 600 cps., and a Brookfield viscosity of above about 3,000 cps. after retorting at retort temperatures of about 190°–210°F. in acid media (pH 3.5–4.5). This starch derivative will also exhibit thin-thick viscosity at a more nearly neutral pH (6.5) when heated up to 260°F., the product being even more heat stable at the more neutral pH.

Retort media made from this hydroxypropylated, crosslinked waxy maize starch derivative does not degrade when subjected to the rapid heating required for the HTST procedure, and thickens well in both acid and neutral food systems. Waxy maize is a root-type starch which is bland in taste, and is particularly useful for combining with bland foods, and foods which have delicate flavors. It is believed that the unusually high degree of crosslinking evidenced by an alkali fluidity ranging from 30–75 ml. for a 3.0 gm. sample provides the excellent stability observed. The crosslinking agents which have been used successfully include epichlorohydrin, phosphorus oxychloride, and sodium trimetaphosphate. The alkali fluidity measurement, which is also referred to as an inhibition index, is presently considered the best means for monitoring the crosslinking level, and thereby controlling the reaction to obtain the desired degree of inhibition from the particular crosslinking agent employed. The alkali fluidity test procedure is described in detail below.

The waxy maize starch derivative may have a hydroxypropyl degree of substitution (d.s.) per anhydroglucose unit of 0.1–0.23, and may be as low as 0.06, if careful adjustments are made, with the preferred range being from 0.15 to 0.2. The degree of hydroxypropyl substitution is controlled by monitoring the extent to which the pasting temperature is depressed during the reaction. A pasting temperature depression of 15°–20° F. indicates the correct range of substitution.

The product is a balance between crosslinking and substitution. When one or the other is found to be at the lower end of the range considered acceptable, it can be compensated by adjusting the level of the other constituent. For example, a crosslinked starch having an alkali fluidity of about 70 ml (highly crosslinked), can be adjusted to perform well if the level of hydroxypropyl substitution is also at the upper end of the range. The hydroxypropyl substitution, if too high, would produce a cold water soluble product which would be unsatisfactory for retorting. When substitution is too low, the derivative is not stable under retort conditions of pH and temperature. This high amylopectin starch derivative has a specific hydroxypropyl level in combination with a specific crosslinking level which gives it distinctive thin-thick viscosity characteristics at a wide range of pH.

It has been found through experience that product performance is more easily predicted and controlled if the hydroxypropyl substitution is completed first. The amount of depression of the pasting temperature of the substituted starch is then measured (higher substitution gives greater lowering of pasting temperature). The degree of crosslinking is proportionately increased when the pasting temperature is at the low end of the acceptable range. There are, of course, Federal Regulations which limit the levels and kinds of substitution and crosslinking agents which may be employed in foods subjected to federal jurisdiction, and some states have additional regulations which may have to be considered.

The use of epichlorohydrin as a crosslinking agent is presently preferred, because it is acceptable (under present Federal Regulations) as a food additive having no toxic reaction by-product, and because it is believed that the ether linkages obtained through use of this reagent are more stable than other types of linkages, such as ester linkages. As mentioned above, the degree of crosslinking is carefully controlled by monitoring the alkali fluidity of the reaction mixture, and by neutralizing with acid as soon as the target alkali fluidity of 30–75 ml., (3.0 g. starch, d.s.b., .375 N NaOH) is obtained. The reaction is stopped at this point, since it has been found that this particular degree of crosslinking combined with the above hydroxypropyl degree of substitution will produce a starch derivative having the necessary viscosity behavior under acid to neutral pH conditions.

This modified starch is useful over a wide range of pH as a thickener in sealed container retort media such as canned pie fillings, soups, sauces, puddings and in other prepared foods utilizing high temperature, short-time sterilization (HTST) continuous retort equipment or static sterilizers which require rapid heat penetration and good heat stability under superatmospheric pressure. This thin-thick starch derivative allows rapid heat penetration while thin to facilitate product sterilization in the sealed container and then thickens rapidly to the desired viscosity without degrading. Faster retorting is preferred, because holding foods at retort temperatures for long periods greatly reduces flavor, and also adversely affects nutritive value. The recently developed continuous, high temperature, short sterilization time (HTST) food processing equipment require starch derivatives which are initially low in viscosity and which will allow rapid heat penetration to temperatures above 190° F. (acid media) during retorting. The product must also attain a final viscosity after retorting at the high temperature which will keep the canned food distributed throughout the canning media. When conventional starches are used, they are either degraded due to acid or heat instability, or both, or the required temperature for the heat sterilization step of the process is never attained in the internal portion of the canned article being processed within the short time the canned article is exposed to the retort heating means.

DETAILED DESCRIPTION OF THE INVENTION

The following detailed description of the invention is intended to illustrate the preferred mode of practicing the invention. To appreciate the information set forth, some description of the test equipment is believed helpful.

The apparatus used for obtaining the information recorded in the following examples was designed to duplicate on a smaller scale the process environment for a typical continuous retorting system. Comparisons of these tests with performance tests on actual continuous retorting equipment has confirmed the accuracy of the observations made with the laboratory equipment.

RETORT TEST

The test equipment used to obtain the data reported in the examples include a mineral oil bath, controlled heat input means for maintaining the bath at the required temperature range (about 190°–260° F.), and oscillatable conveyor means for moving the individual test cans through the oil bath. Thermocouples for recording internal food mass temperatures are provided to be inserted in each test can, and have pressure sealing means for the external connection. A thermocouple is also provided to record the oil bath temperature. Each can sample weighed about 300 grams, since the test cans were number "one" size (about 300 cc.).

The individual cans filled with the starch retort media were clamped to the conveyor means, and the thermocouples inserted. The oil bath temperature control was set for a bath temperature of about 210°–260° F., depending on whether acid or neutral media tests were to be made. The filled test cans were them immersed in the heated oil bath, and rotation about 270° in one direction, and then in the opposite direction at a total speed of about 20 rpm for a time period of about 20 minutes. Temperatures inside each can were recorded automatically and were noted as indicated in the examples. The slurries used in these tests were mixed to duplicate the food canner's typical acid and neutral pH canning media requirements.

ALKALI FLUIDITY TEST (INHIBITION INDEX)

The alkali fluidity test referred to herein was found to be the most convenient means of controlling the degree of crosslinking, and is accomplished with the same equipment in all the examples given. The test is generally described in U.S. Pat. No. 3,238,193 at the paragraph bridging columns 7 and 8. The concentration of the alkaline starch dispersion for a particular test sample is established with 90 ml. of 0.375N sodium hydroxide to a slurry of neutralized, filtered, water-washed wet starch cake containing 3 grams of the starch derivative, dry solids basis (d.s.b.). The sample is slurried in water to make 10 ml. of total water prior to the addition of 90 ml. of 0.375 N sodium hydroxide. After mixing the starch slurry with the sodium hydroxide solution, a paste is obtained. This suspension is stirred at between 450 and 460 rpm for three minutes in order to completely disperse (swell) the starch. The resulting starch dispersion is poured into a fluidity funnel having a specific "water time" between about 30 and 40 seconds. The number of ml. of starch solution which flows through the funnel in the water time (defined below) is the alkali fluidity of the starch. The extent of crosslinking is monitored by repeating the above test at regular intervals with samples taken from the reaction mixture. When the alkali fluidity test is within the desired range, the crosslinking reaction is stopped.

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a sixty degree angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the water time of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height from the lower end of the funnel body passage to the lower external orifice of the funnel tip includes the height of the ball chamber (0.1008 inches) and the length (0.0492 inches) of the funnel tip opening.

The composite apparatus described above is vertically disposed above a graduated cylinder for the actual tests. At the beginning of each test, the water time for the apparatus is checked by running 100 ml. of pure water through the funnel and recording the total elapsed time. The water time then becomes the time against which each sample is tested.

The flow through the funnel during the water time is measured in milliliters and recorded after each test. The funnel is thoroughly washed between tests to avoid irregular observations. The above alkali fluidity test procedure was followed throughout the tests, using a 3 gm., d.s.b. starch derivative sample.

BRABENDER (PROCEDURE A)

There are two general procedures used in the examples below using Brabender equipment. The Brabender tests are conducted at atmospheric pressure, so they do not represent the even greater viscosity behavior improvement realized when the starch derivatives of the invention are retorted under superatmospheric conditions of the closed, sealed containers in the retort procedure. The procedure described immediately below was used to gather the data set forth in Table I and II below Preparation of Buffers Each buffer was prepared by combining 990 g. distilled water, 10 g. anhydrous dibasic sodium phosphate ($Na_2HPO_4$), 2 g. sodium benzoate and enough crystalline citric acid monohydrate to adjust to the appropriate pH using a Corning Model 7 pH meter.

Preparation of Buffered Slurries for Brabender Tests

| Starch Wt. (as is) | Starch Wt. (d.s.b) | % Starch in Buffer | Buffer Used pH | Additional Ingredients |
|---|---|---|---|---|
| 28.09 g. | 25.00 g. | 5.00 | 3.5 | 15% by wt., d.s.b.* sucrose |
| 30.90 g. | 27.50 g. | 5.50 | 5.0 | 1% by wt., d.s.b., salt |
| 33.71 g. | 30.00 g. | 6.00 | 6.5 | 1% by wt., d.s.b., salt |

*d.s.b. = dry solids sucrose, based on total weight of the starch/buffer aqueous slurry.

Weigh the appropriate amount of starch into a 600 ml. beaker and add the appropriate buffer solution to a total of 500 g. plus salt or sucrose as indicated in the preceding table. Transfer contents to a Brabender cup.

Operation of the Brabender

The Brabender equipped with a 700 cm.g sensitivity cartridge is set in the "neutral" position with the controlled cooling water on. The thermoregulator is set at 50° C. When the indicator light shows the slurry has reached 50° C., the timer is set at 30 minutes, the transport in the "up" position and the cooling water off.

At the end of 30 minutes, the temperature has reached 95° C. as indicated by the thermoregulator. The transport is placed in the neutral position with the cooling water off. The timer is left set at 30 minutes and the Brabender started. After 30 minutes, the paste in the Brabender cup is still at 95° C.

Then the transport is set in the "down" position, the cooling water turned on, the timer left set at 30 minutes and the Brabender started.

After 30 minutes, the thermoregulator shows the temperature of the paste in the cup has reached 50° C.

The controlled cooling water is left on, the transport set in the neutral position and the timer set for 10 minutes. The Brabender is then started. The hold period at 50° C. is to assure uniform temperature throughout the starch paste.

The Brabender values for the starch samples 1–3 are all increasing to indicate a pronounced and stable increasing viscosity behavior of the starch product of the invention over a wide pH range from very acid to nearly neutral. The starch solids level was progressively higher as the pH level became higher. The values for each sample demonstrate that this starch derivative is stable over a wide pH range, and can therefore be used, with proper solids level adjustment. For example, as indicated in Table III, when the buffer pH is 3.5, then starch derivative solids level of 5% is adequate. At pH 6.5, a 6% solids level is optimum.

BRABENDER (PROCEDURE B)

The Brabender equipment may be adapted to make a determination of the cooked pastes derived from the starch derivatives of the invention by making a two-point measurement of the viscosity over a fixed period under very specific conditions. A Brabender Viscograph is typical of the apparatus usually utilized to make such viscosity determinations. This instrument traces a continuous graph record of the viscosity of the test sample, thereby providing viscosity data during the heating, holding, and cooling cycles. The results are reported in Brabender Units (BU). Thus, for example, uninhibited starch products will exhibit relatively high peak viscosities during the heating cycle and relatively large viscosity decreases during a holding cycle, e.g. when maintained for 10 minutes at about 92° C. Furthermore, lightly inhibited starches also exhibit high peak viscosities but do not show the marked viscosity decrease during the holding period which is characteristic of the uninhibited starch product. On the other hand, moderately inhibited products do not exhibit any peak viscosities but do undergo viscosity increases during the holding period. The Brabender viscosity is determined herein using a pH 3.0 buffer aqueous system.

For the tests reported at Table Number VII this latter Brabender Procedure B was used. A pH 3.0 buffer system was used for these tests according to the following detailed procedure Solution A was prepared by adding 210.2 grams of citric acid monohydrate to a 1 liter, volumetric flask and adding thereto distilled water to the 1000 ml. mark. Then solution B, comprising 98.0 grams of trisodium citrate dihydrate also in an amount of distilled water necessary to make 1 liter of solution was similarly prepared in another 1 liter, volumetric flask. Thereafter 23.0 grams (anhydrous) of each test sample were placed in separate beakers which contained 50.0 grams of a buffer solution comprising 1.5 parts of the said solution A to each 1.0 parts of solution B. A sufficient quantity of distilled water was then added to each beaker to achieve a final weight of 460.0 grams. Each of the slurries, thus obtained, were introduced into the Brabender unit at room temperature (25° C.), and then rapidly heated to 92° C. and held at that temperature for 10 minutes. In each instance the viscosity was measured, using a 350 cm. g. sensitivity cartridge. The viscosity when the temperature first reaches 92° C. and 10 minutes after the temperature reaches 92° C. is recorded and the results are presented in the Table.

BOSTWICK VISCOSITY PROCEDURE

A Bostwick Viscometer can also be used to measure the viscosity of the cooked pastes of these starch derivatives. The Bostwick viscosity is the distance which a sample flows in "X" seconds on an inclined plane. The Bostwick Viscometer includes a calibrated inclined plane, with a test sample receptacle at the top, and means for releasing the sample to flow down the calibrated ramp. The greater the distance traveled, the lower the viscosity.

The results reported in Table II were obtained using equipment obtained from Central Scientific Company, 2600 South Kostner Avenue, Chicago, Ill. The Bostwick readings were taken on room temperature pie fillings after the cans were allowed to cool overnight before opening and testing.

These high temperature stable, thin-thick retort starch derivatives can be defined by a variety of tests, but it is presently believed that the level of substitution (hydroxypropyl), the alkali fluidity test (which shows the level of crosslinking), coupled with specific Brookfield or Brabender data define these new starch derivatives quite well.

The following detailed examples illustrate the presently preferred modes of practicing the invention, but they are not intended to limit the scope of the invention, which is believed to have wide application to other foods, in addition to canned foods which are retorted. Unless otherwise noted, the above described test procedures were used in the detailed examples set forth below. The two different Brabender procedures are designated where used.

EXAMPLE 1

A slurry of 4,000 g. (d.s.b.) waxy maize starch was made up with sufficient water to make 10,400 g. of slurry (38.5% d.s.). Anhydrous sodium sulfate (300 g.) was added to this slurry, and then 800 g. of 5% NaOH (40 g. dry solids NaOH) and 100 g. of anhydrous sodium sulfate in water was added dropwise at room temperature (about 76° F.). Then 380 g. of propylene oxide was added and the mixture was warmed to 100° F. for 65 hours. The mixture was then warmed to 110° F. and 2.4 g. of epichlorohydrin was added and crosslinking was allowed to continue for 4–8 hours, while being monitored with alkali fluidity tests taken at 4, 5, 6 and 8 hours. The sample size was 3.0 g. of starch derivative, first slurried in about 8 ml. of water and then added to 90 ml. of .375 N NaOH. The alkali fluidity measured as set forth above for the required crosslinking was well within the range of 30–75 ml., and also within the preferred range of 50–70 ml. at pH 4.5–5.0. Brabender data was also taken for this series of samples using Procedure A, and very clearly indicates the thin-thick viscosity characteristics, even under atmospheric conditions. The results are reported in Table I immediately below:

TABLE I

| Sample No. | Cross-linking time (hr.) | Alkali Fluidity (3 g.d.s.) | Brabender Data (pH 3.5 Buffer with 15% Sucrose) 5% starch solids | | | |
|---|---|---|---|---|---|---|
| | | | Paste temp. | Initial at 95°C. | 30 min. at 95°C. | 10 min. at 50°C. |
| 1 | 4 | 57 ml. | 65.5°C. | 130 B.U. | 270 B.U. | 530 B.U. |
| 2 | 5 | 65 ml. | — | — | — | — |
| 3 | 6 | 70 ml. | 66.5°C. | 65 B.U. | 180 B.U. | 400 B.U. |
| 4 | 8 | 75 ml. | 67°C. | 35 B.U. | 140 B.U. | 385 B.U. |

The above table clearly shows that the starch derivative of the invention continues to develop viscosity during heating up to about 95° C. and even after cooling to about 50° C.

The starch product of Example 1 was used in a retort test using the test equipment described above, and its performance was compared to a commercial canner's starch (believed to be an acetylated starch with some crosslinking). The results of this comparison are set forth below in Example 2.

EXAMPLE 2

The two retort media were made up as blueberry pie fillings according to the following recipe:

| Starch Slurry | % | Per 500 g. Total |
|---|---|---|
| Water | 54.2 | 271 g. |
| Citrate Buffer | 5.9 | 29.5 g. |
| Sugar | 33.0 | 165.0 g. |
| Starch | 6.7 | 33.5 g. |
| Salt | .2 | 1.0 g. |
| | 100.0% | 500.0 g. | product never, in fact, fully cooked out during the total retort time of 17.5 minutes. The heat penetration and stability of this product at the more neutral pH improves directly with the requirement for the higher cooking temperatures, and as demonstrated below, this product exhibits the required thin-thick viscosity behavior, even under the atmospheric conditions of the Brabender tests. Table III below is a record of Brabender values using Procedure A observed for a sample of this hydroxypropylated (d.s. 0.1–0.2) epichlorohydrin crosslinked (alkali fluidity was 68 ml. for 3 gm. sample, 0.375N NaOH) waxy maize when tested as follows:

TABLE III

| Sample | Buffer pH | % Starch Solids | 10' (65°C.) | 20' (80°C.) | 30' (95°C.) | 40' (95°C.) | 50' (95°C.) | 60' (95°C.) | 70' (80°C.) | 80' (65°C.) | 90' (50°C.) | 100' (50°C.) |
|---|---|---|---|---|---|---|---|---|---|---|---|---|
| 1 | 3.5 | 5.00 | 0 | 65 | 105 | 170 | 215 | 240 | 300 | 365 | 440 | 455 |
| 2 | 5.0 | 5.50 | 0 | 75 | 85 | 120 | 140 | 160 | 215 | 285 | 380 | 390 |
| 3 | 6.5 | 6.00 | 0 | 150 | 150 | 180 | 210 | 230 | 300 | 400 | 530 | 540 |

Values are Brabender Units (B.U.): 700 cm.g head; 75 rpm

The above mixture (201.6 grams) was then blended with blueberries (118.4 grams) to make up a total of 320 grams of blueberry pie filling for the retort tests. The two samples were identical in all respects except for the starch derivatives to be compared.

After blending, the samples were sealed in the retort cans and continuously retorted using the test equipment described above to an inside can (food mass) temperature of 195° F. in a 250° F. oil bath. The heat penetration results could be judged, based on the internal can temperatures recorded in Table II. The samples were also allowed to cool overnight before opening and additional testing. The Bostwick Viscosity Data reported in Table II was obtained using the Bostwick Viscometer equipment and procedure described above after the cans had completely cooled overnight.

The Brabender values for the starch samples 1–3 (Table III) are all increasing to indicate a pronounced and stable increasing viscosity behavior of the starch product of the invention over a wide pH range from very acid to nearly neutral. The starch solids level was progressively higher as the pH level became higher. The values for each sample demonstrate that this starch derivative is stable over a wide pH range, and can therefore be used, with proper solids level adjustment. For example, as indicated in Table III, when the buffer pH is 3.5, then starch derivative solids of 5% is adequate. At pH 6.5, a 6% solids level is optimum.

EXAMPLE 3

In a test on a Steritort unit (available from FMC Corporation, San Jose, Calif.) a pie filling formula was made up as follows:

TABLE II

| Sample A | Heat Penetration (Retort Time) | | | Bostwick | | | |
|---|---|---|---|---|---|---|---|
| | 5 min. | 10 min. | 15 min. | 5 Sec. | 15 Sec. | 30 Sec. | 60 Sec. |
| (Commercial Canner's Starch) | 170 | 171 | 180 | 2.8 | 3.5 | 3.8 | 4.4 |
| Sample B (Hydroxypropylated, crosslinked waxy maize) | 170 | 179 | 195 | 0.8 | 1.8 | 2.2 | 2.4 |

The Bostwick readings for Sample B retorted pie filling using the starch product of the invention were much lower than for the commercial canner's starch, Sample A, clearly demonstrating that excellent viscosity had been obtained in the retort processing of Sample B. That heat penetration was sufficient to obtain the required thermophile sterilization was indicated by the internal can (food mass) temperatures observed. Sample B had already attained the required sterilizing temperature (195° F.) after only fifteen minutes from the start of retorting. Sample A, by contrast, had only reached a temperature (internal) of 180° F., so sterilization had not yet commenced. When Bostwick data was taken on the samples the following day, the Sample A Bostwick showed a pie filling considerably less viscous than Sample B, confirming that the Sample A

| Ingredient | % |
|---|---|
| Water | 54.59 |
| Sugar | 5.22 |
| High Fructose Corn Syrup | 7.80 |
| Dextrose | 9.46 |
| Juice (from the cherries) | 15.84 |
| Starch (test or control) | 7.09 |
| | 100.00% |

The above slurry (355 grams) was mixed with cherries (255 grams) to make up a total 610 grams. A representative comparison for retorting in the Steritort using an acetylated, crosslinked starch derivative and applicants' starch derivative was made, and the results are shown in Table IV below:

TABLE IV

| Starch Sample | Temp. of Slurry | Starch Level | Can Speed/ (min,) | Reel Speed (rpm) | Time at 180° (min.) | Time at 210° (min.) | Time at 255° (min.) | Final Can Temp.-out of Retort | 30 sec. Bostwick (cm.) |
|---|---|---|---|---|---|---|---|---|---|
| A | 150° | 4.12% | 260 | 6.2 | 6½ | 6½ | 9¾ | 169½ | 4.75 |
| B | 75° | 3.81% | 260 | 6.2 | 6½ | 6½ | 9¾ | 196 | 5.5 |

The internal can temperature of Sample A after a total retort time of about 22¾ minutes was only 169°F., whereas the internal can temperature of the Sample B slurry made according to the invention was already 196°F. after 22¾ minutes of retorting. In all tests conducted, the final internal can temperature was considerably higher using applicants' starch product, indicating excellent heat penetration.

It should be noted that the can speed through the Steritort was 260 cans per minute, which is considered an excellent production rate for this canning process. The Sample A cans never reached the required temperature needed to cook out successfully at this rate. The Sample A heat penetration rate was so low that sterilization was questionable, and the sample could probably not be considered safe under good manufacturing practice. The temperature difference at which good sterilization is obtained can be as small as a few degrees above an unacceptably low temperature, because once the undesirable microorganisms are heated above the "kill temperature," all of the microorganisms are killed rapidly. It can be seen that the starch derivative here provided has that necessary improvement in heat penetration rate, and the 30 sec. Bostwick measurements indicate that it was in fact a very useful pie filling with no retrogradation. Taste panel results were reported as excellent for Sample B.

In comparing the above examples, it can be seen that the modified waxy maize starch derivative made according to the invention gave excellent results in testing, and is, therefore, preferred thin-thick hydroxypropylated, crosslinked starch for use in acid to neutral media for HTST continuous retort canning processes which require a high initial heat penetration of the fluid starch medium, such as puddings and blueberry pie filling. Heat penetration is best at low viscosity levels, but the starch viscosity is maintained high enough to support the food pieces being canned while avoiding splattering during can filling. After the heat sterilization step, the starch medium at an initial concentration of about 5% d.s.b. starch in pH 3.5 buffer solution thickens to a 30 sec. Bostwick viscosity of 5.5, which effectively maintains the canned food in suspension. The starch solids level required to obtain the desired viscosity behavior is less than formerly required, so this represents a saving in canning costs because less starch is required. Other advantages obtained with these thin-thick retort media are: pumping is simplified, along with easier filling and handling. Much less heat energy is required to accomplish acceptable thermophile sterilization, and with this goes the inherent advantages of better color, flavor and food value, especially for delicate foods.

EXAMPLE 4

To a slurry of 4,500 g. (d.s.b.) of waxy maize starch in water to make 12,600 g. at R.T. were added 450 g. of anhydrous sodium sulfate, 900 g. of 5% sodium hydroxide solution and 450 g. of propylene oxide. The slurry was heated to 110°F. for 20 hr. and 2.29 ml. (0.060%, d.s. starting starch basis) of epichlorohydrin was added. Samples of 300–350 g. (d.s.b.) were removed at close intervals. Sample E4 reported in the Tables below comprising about 300–350 g (d.s.b) was removed from the crosslinking reaction mixture at about 3.5 hrs., adjusted to pH 5.0 with 5N $H_2SO_4$, filtered washed and dried.

EXAMPLE 5

The same procedure was followed as for Example 4, except that the crosslinking reaction was allowed to continue for about 8 hours before a 300-350 g. (d.s.b.) sample was removed, adjusted to pH 5.0 with 5N $H_2SO_4$, filtered, washed and dried. This sample is designated Sample E5 in the tables below.

EXAMPLE 6

To a slurry of 1500 g. (d.s.b.) of waxy maize starch in water to make 4200 g. at R.T. were added 150 g. of anhydrous sodium sulfate, 300 g. of 5% sodium hydroxide solution and 150 g. of propylene oxide. The slurry was heated to 110°F. for 18 hrs., and then 4.5 g. (0.30%, d.s. starting starch basis) of sodium trimetaphosphate was added. After 4.5 hrs., the slurry was adjusted to pH 5.0 with 5N sulfuric acid and the starch was filtered, washed and dried. This sample is designated E6 in the tables below.

EXAMPLE 7

To a slurry of 1500 g. (d.s.b.) of waxy maize starch in water to make 4200 g. at R.T. were added 150 g. of anhydrous sodium sulfate, 300 g. of 5% sodium hydroxide solution and 150 g. of propylene oxide. The slurry was heated to 110°F. for 20 hrs. and then 0.90 g. (0.060% d.s. starting starch basis) of phosphorus oxychloride was added. In 30 minutes, the slurry was adjusted to pH 5.0 with 5N sulfuric acid and the starch was filtered, washed and dried. In the tables below, this sample is designated E7.

EXAMPLE 8

To a slurry of 1715 g. (1500 g., d.s.b.) of waxy maize starch in water to make 4200 g. at 46°C. were added 88.2 g. (5.88%; 0.163 mole/mole starch, d.s.b.) of sodium chloride, 19.65 g. (1.31%; 0.053 mole/mole starch, d.s.b.) of sodium hydroxide in a 5% aqueous solution (393 g. soln.) and 2.780 g. (0.1853%; 0.30 g./mole starch, d.s.b.) of sodium trimetaphosphate. After 8 hrs., the slurry was adjusted to pH 5.5 and the starch was filtered, washed with 2000 ml. of water and reslurried to 4100 g. with water.

Then 184 g. (12.27%; 0.34 mole/mole starch, d.s.b.) of sodium chloride was added. The slurry was heated to 50°C. and 29.6 g. (1.975%; 0.08 mole/mole starch, d.s.b.) of sodium hydroxide in water to make 494 g. (6% soln.) was added, and allowed to react for 2 hours.

Then 46.6 g. (4.66%; 0.13 mole/mole starch, d.s.b.) of propylene oxide dissolved in 130 g. of water (freshly prepared) was added, per 100 g. starch (d.s.b.).

The reaction was continued at 50°C. for 6 hrs., adjusted to pH 5.5 with 5N sulfuric acid, and the starch filtered, washed and dried. This example is believed to generally follow the preparation of a starch derivative as set for in Example IV of U.S. Pat. No. 3,751,410 issued Aug. 7, 1973 to Caracci et al., and in the tables below, it is designated Sample E8.

For purposes of testing and comparison of properties, the Commercial Canner's Starch designated Sample A in Table II above, was also subjected to the same tests as were performed on Samples E4–E8 below. As mentioned above at Example 1, Sample A is believed to be an acetylated starch with some crosslinking.

The autoclave comparisons reported in Table VIII were performed in a Castle (Type 999C) Autoclave, sold by Sybron Corporation, Rochester, N.Y. The autoclave was modified by providing a thermocouple attachment to connect the No. 1 (300 cc) sealed container samples so that the internal mass temperatures of the sample retort media could be read directly and continuously during the autoclave tests.

As operated, the cans were not agitated in the autoclave, and all samples were handled the same. For these tests, the steam regulator pressure was set to 22 psig., maximum. The operating procedure generally followed the manufacturer's instructions, except the test can thermocouples were connected to the thermocouple attachment prior to sealing the autoclave for each test. The retort times and temperatures were set as indicated in the tables below. Selection of retort time and temperature was determined by the pH of the samples being tested.

TEST RESULTS

Brabender tests were conducted for the above samples following Brabender procedure A. In the tests reported below in Table V, a 30 g. (d.s.b.) sample of each starch derivative in pH 6.5 buffer containing 1% NaCl to a total of 500 g. (6% starch concentration) was employed. The Brabender readings were as follows:

TABLE V

| SAMPLE | INITIAL at 95°C. | 30 min. at 95°C. | 10 min. at 50°C. |
|---|---|---|---|
| A | 855 | 835 | 1165 |
| E8 | 375 | 465 | 835 |
| E4 | 380 | 480 | 955 |
| E5 | 95 | 140 | 445 |
| E6 | 250 | 335 | 760 |
| E7 | 110 | 160 | 490 |

Review of the above table shows that the commercial canner's starch, Sample A actually had a lower viscosity at 30 minutes than initially (835 B.U., as compared to 855 B.U.). This indicates a starch derivative which is too thick initially for the required high rate heat penetration in the food mass. Although Sample A thickened somewhat on cooling, it was not enough to indicate that it had thoroughly cooked out. Sample E8 went from an initial reading of 375 B.U. up to a final of 835 B.U., giving a ratio of 2.23 in thin-thick. The closest of applicants' products, Sample E4, went from 380 to 955 B.U., showing a thin-thick ratio of 2.52, which is significantly higher than E8. The actual finished reading was about 90 B.U. more for E4 than for E8. Samples E5 through E7 of the invention exhibited thin-thick ratios from initial to finish viscosity which were even higher than Sample E4. For example, the thin-thick ratio for Sample E5 was 4.95, E6 was 3.04 and E7 was 4.45.

Another series of Brabenders was conducted on these same samples, using the same procedure, but 25 g. (d.s.b.) starch derivative samples were used in 3.5 buffer to provide a total of 500 g. of sample. To this was added 75 g. of sucrose to give 15% sucrose based on the weight of the starch and buffer. The Brabender readings for the samples were as reported below:

TABLE VI

| SAMPLE | Initial at 95°C. | 30 Min. at 95°C. | 10 min. at 50°C. |
|---|---|---|---|
| A | 445 | 430 | 575 |
| E8 | 215 | 325 | 500 |
| E4 | 195 | 320 | 560 |
| E5 | 50 | 155 | 360 |
| E6 | 145 | 280 | 495 |
| E7 | 80 | 220 | 445 |

Sample A, again, actually lost viscosity between the initial reading and the 30 minute reading indicating some thinning effect, and at least poor heat penetration. Sample E5 showed the lowest initial viscosity and the largest increase to final viscosity of more than seven times the initial. Sample E4 improved viscosity by a factor of 2.87 while Sample E8 only increased by a factor of 2.32. The above Samples E4 through E7 all had alkali fluidity values (inhibition index) in the range of about 32–75 ml. for 3 g. (d.s.b.) at 0.375 N NaOH, following the test procedure set forth above.

The samples were also tested for Scott viscosities as outlined in the previously described test procedure and a range of 15–32 seconds in Scott viscosity was observed for Samples E5 through E7 starch derivatives. The middle Scott viscosity levels in the above range are considered an indication of a more desirable thin-thick starch product, and a Scott viscosity of about 22 is believed completely acceptable.

When Brabender tests were performed following Procedure B described above, the following results were obtained:

TABLE VII

| SAMPLE | INITIAL at 92°C. | 10 min. at 92°C. |
|---|---|---|
| A | 775 | 740 |
| E8 | 370 | 515 |
| E4 | 395 | 585 |
| E5 | 75 | 200 |
| E6 | 255 | 430 |
| E7 | 110 | 290 |

It can be seen from these results, that Samples E4 to E7 had initial Brabenders ranging from 75–395 B.U. and ten minute results in the range of 200–585 B.U., in all cases higher than the initial value. The ratio of the thick to thin measurements was again higher for all samples E4 to E7 than for either Sample A or Sample E8. It must be remembered that the Brabender tests are conducted under atmospheric conditions of pressure and are not completely indicative of the marked improvement observed using the starch derivatives of our invention under actual retort conditions.

Table VIII below shows the Brookfield viscosities observed for the above samples when retorted in an autoclave at 260°F. for 30 minutes. In these tests, one set of the samples were made up at 5% starch derivative (d.s.b., in pH 6.5 buffer with 1% NaCl, based on the buffer). The slurries were first heated to 180°–185°F. and the Brookfield viscosities were measured at that temperature. After retorting for the times specified, the samples were allowed to cool to room temperature (74°–76°F.) before the final viscosity measurements were taken. The second set of samples were tested under similar conditions, but were made up at 4% starch derivative (d.s.b.) in 3.5 pH buffer plus sucrose 15% based on the starch and buffer (e.g., 500 g. starch and buffer, 75 g. sucrose). The results set forth in Table VIII include the thin-thick viscosity increase factor, which were calculated by dividing the initial viscosity into the final viscosity.

The second concern, but of equal importance, in the retort media selection is the effect it has on flavor of the retorted product. A third major consideration is the versatility of the retort media to be used over a wide pH range.

The subject starch derivative fills all of the above requirements beautifully. It permits initial high speed heat penetration to allow the internal can temperature in the food mass to rise rapidly to obtain the required thermophile sterilization, and immediately thereafter the starch derivative canning media thickens rapidly to hold the canned food in a desirable suspension. The product flavor is not adversely affected by this starch

TABLE VIII

| SAMPLE | pH | % Starch | Retort Time (min.) | Brookfield Viscosities (cps) Before | After | Ratio After/Before |
|---|---|---|---|---|---|---|
| A | 6.5 | 5 | 30 | 4,550 | 3,900 | 0.857 |
|   | 3.5 | 4 | 17 | 3,200 | 3,700 | 1.156 |
| E8 | 6.5 | 5 | 30 | 285 | 4,500 | 15.789 |
|   | 3.5 | 4 | 16 | 420 | 4,700 | 11.190 |
| E4 | 6.5 | 5 | 30 | 250 | 6,200 | 24.800 |
|   | 3.5 | 4 | 10 | 450 | 6,100 | 13.556 |
| E5 | 6.5 | 5 | 30 | 27.5 | 1,925 | 70.000 |
|   | 3.5 | 4 | 10 | 37.5 | 4,000 | 106.667 |
| E6 | 6.5 | 5 | 30 | 92.5 | 4,950 | 53.514 |
|   | 3.5 | 4 | 10 | 142.5 | 4,900 | 34.386 |
| E7 | 6.5 | 5 | 30 | 27.5 | 2,900 | 105.455 |
|   | 3.5 | 4 | 10 | 42.5 | 4,500 | 105.882 |

The main advantage of this subject waxy maize starch derivative is that it can be used under acid pH conditions, as well as more neutral pH. Of course, it must be appreciated that the more acid pH conditions weaken the starch granules when the product is used in high temperature short time sterilization (HTST) retorting, but under acid pH sterilization is not as difficult because the microorganisms are unable to survive in acid conditions. The heat penetration and stability of this product at the more neutral pH improves directly with the requirement for the higher cooking temperatures, and as demonstrated above, this product exhibits the required thin-thick viscosity behavior, even under the atmospheric conditions of the Brabender tests.

As pointed out above, the starch derivative is ideally suited for use at superatmospheric pressures, and the HTST Steritort type continuous retort canning system such as is manufactured by FMC Corporation, San Jose, California. The canning engineer well appreciates the ideal suitability of this starch derivative for the HTST systems. Examples of the calculations necessary to determine sterilization values are set forth in the *Laboratory Manual for Food Canners and Processors*, Volume One - Microbiology and Processing, compiled by the National Canners Association Research Laboratories, AVI Publishing Company, Inc., 1968, pp. 220 ff. The canning engineer who is creating a canning media for HTST systems is concerned with the $F_o$ value for the canning media he is using (the number of minutes required to destroy a given number of organisms at a given temperature). He also needs to know the Z value (the number of degrees F. required for the thermal death time curve to transverse one logarithmic cycle, and the Z value measures the change in thermal death time or death rate with changing temperature). As indicated in the NCA publication mentioned above, the microorganisms used for the calculations are those which have the most resistance to heat, such as strains of *C. botulinum*, and certain other substitutes.

derivative, and the canned product is uniformly suspended in a clear, well bodied, and smooth textured retort media.

In review, the subject starch-based, hydroxypropylated, epichlorohydrin crosslinked starch derivative of the invention is ideally suited for use in acid to neutral food systems having a pH ranging from 3–7 because of its full pH range thin-thick viscosity behavior. The preferred degree of substitution of hydroxypropyl units is about 0.15 to 0.2. A high degree of crosslinking of a non-labile type is required to obtain the required acid stability in acid retort media, but does not interfere with the product's function at neutral pH. This range of crosslinking has been controlled best by running alkali fluidity tests on 3 g. samples during the crosslinking reaction. An alkali fluidity range of 30–75 is acceptable, and a range of 40–60 is preferred.

In addition, the high amylopectin starch derivatives of this invention are particularly useful for retort foods having particularly delicate flavors. The resulting products retain very nearly all of the original flavor with no flavor interference from the starch derivative, and the short retort time at high temperatures (made possible by excellent heat penetration rate) also greatly aids in flavor retention of the retorted products.

We claim:

1. An hydroxypropylated, crosslinked high amylopectin starch derivative selected from the group consisting of waxy maize, waxy sorghum, waxy milo, and waxy starches having less than 20% amylose content, said starch derivative having a degree of substitution of hydroxypropyl units of about 0.1 to 0.23, and subjected to crosslinking with a crosslinking agent capable of producing heat stable crosslinks selected from the group consisting of epichlorohydrin, phosphorus oxychloride and sodium trimetaphosphate, said crosslinking being sufficient to obtain an alkali fluidity ranging from about 30–75 ml. for a 3 gram sample of the starch derivative slurried in about 10 ml. of water and 90 ml. of 0.375N NaOH, said starch derivative being capable of developing substantially increased viscosity when used in retort media comprising about 3.5–6% dry substance basis of said starch derivative buffered at a pH of 3–7, and when retorted under superatmospheric pressure for up to 20 minutes using a heat source capable of raising the internal temperature of the retort media to at least 190°F., said retort media having a heat penetration rate without degrading the starch derivative such that the internal temperature of said retort media is capable of attaining a temperature of at least 190°F. after heating under retort conditions for 8–25 minutes.

2. The starch derivative of claim 1, in which the retort media can be heated to a temperature of about 260°F. in less than 14 minutes at a pH of about 6–7 without degrading the starch derivative.

3. The starch derivative of claim 1, in which the starch derivative is acid and heat stable in the full pH range from 3–7 under the said retort conditions, employing about a 300 ml. slurry sample of 5% (d.s.b.) aqueous slurry in a sealed container.

4. The starch derivative of claim 1, in which the starch is waxy maize starch.

5. The starch derivative of claim 4, in which the crosslinking agent is epichlorohydrin, and the final Brookfield viscosity taken at room temperature of 74°–76°F. after said slurry sample has been retorted is at least about 3,500 centipoise.

6. The starch derivative of claim 5, in which the aqueous slurry sample has an initial Brookfield viscosity which is less than one third said final viscosity.

7. An hydroxypropylated, crosslinked high amylopectin, waxy maize starch derivative having a degree of substitution of hydroxypropyl units of about 0.15 to 0.23 and subjected to crosslinking with epichlorohydrin in an amount sufficient to obtain an alkali fluidity for said starch derivative of about 40–60 ml. (3 g. (d.s.b.) starch slurried in 10 ml. water, with 90 ml. 0.375N NaOH), said starch derivative having a heat penetration rate without degrading the starch derivative such that a 5% (d.s.b.) aqueous slurry of said starch derivative is capable of increasing in internal mass temperature from less than 80°F. to above 220°F. in less than fifteen minutes when heated in a 300 cc sealed container slurry sample with agitation in an oil bath, said slurry sample having an initial low Brookfield viscosity less than one third the Brookfield viscosity observed at room temperature after heating said slurry sample for about twenty minutes in said oil bath to a temperature in the range of 190°–210°F.

8. The method of sealed container retorting employing the starch derivative of claim 1.

9. A hydroxypropylated, epichlorohydrin crosslinked waxy maize starch derivative, said starch derivative having a degree of substitution of hydroxypropyl units of about 0.1 to 0.23, and subjected to epichlorohydrin crosslinking sufficient to obtain an alkali fluidity ranging from 30–75 ml. for a 3.0 gram sample of the starch derivative slurried in about 10 ml. of water and 90 ml. of 0.375N NaOH, said starch derivative being capable of developing substantially increased viscosity when used in retort media comprising about 3.5–6% dry substance basis of said starch derivative buffered at a pH of 3–7, and having a heat penetration rate without degrading the starch derivative such that said retort media is capable of attaining an internal mass temperature of at least 190°F. after heating in sealed containers under retort conditions for 8–25 minutes.

10. The starch derivative of claim 9, in which the retort media can be heated to a temperature of about 260°F. in less than 14 minutes at a pH of about 6–7 without degrading the starch derivative.

11. An acid and heat stable hydroxypropyl, epichlorohydrin crosslinked waxy maize starch derivative having a heat penetration rate without degrading such that 5% dry substance basis slurry of said starch derivative increases in internal mass temperature from less than 80°F. to about 220°F. in less than fifteen minutes when heated in an oil bath, said slurry having an initial viscosity below 1,100 cps. Brookfield, and a viscosity of at least 3,500 centipoise Brookfield after about twenty minutes heating to a temperature in the range of 195°–210°F., said starch derivative comprising a modified waxy maize starch having a degree of substitution of about 0.1–0.23 of hydroxypropyl units, and a degree of crosslinking from reaction with epichlorohydrin sufficient to provide an alkali fluidity for a 3 gm. sample ranging from 30–75 ml.

12. The starch derivative of claim 11 which is stable under retorting conditions in pH ranging from about 3.0 to 7.0, and which is heat stable up to temperatures of about 260°F. for heat sterilization periods up to about 25 minutes.

13. A modified waxy maize-based starch derivative particularly useful for continuous retort canning, said starch having a hydroxypropyl degree of substitution in the range of 0.1–0.23, and having a degree of crosslinking so that 3 g. d.s.b. of the starch derivative slurried in about 10 ml. of water and 90 ml. of 0.375N NaOH will have an alkali fluidity of 30–75 ml., and a 5% d.s.b. starch solution at pH 3.5 buffer is capable of producing the following viscosity thickening effect when subjected to a Brabender viscosity test (700 cm. g head at 75 rpm):

10–60 minutes at 65°–95°C., from 0 up to 240 B.U.;
50–100 minutes at 95°–50°C., from 215–455, in which the viscosity increases throughout the entire heating and cooling cycles, once gelatinization occurs.

14. The starch derivative of claim 13, in which a 5.5% d.s.b. starch solution in 5.0 pH buffer is capable of producing the following Brabender readings when subjected to the said Brabender test:

10–60 minutes at 65°–95°C., 0–160;
50–100 minutes at 95°–50°C., 120–390.

15. The starch derivative of claim 14, in which a 6% dry substance basis starch solution at 6.5 buffer is capable of producing the following Brabender test readings (700 cm. g head, 75 rpm);

10–60 minutes at 65°–95°C., from 0 up to 230 B.U.;
50–100 minutes at 95°–50°C., from 210–540.

* * * * *